(12) United States Patent
Nishimura et al.

(10) Patent No.: US 12,084,526 B2
(45) Date of Patent: Sep. 10, 2024

(54) VINYL ALCOHOL POLYMER AND METHOD FOR PRODUCING VINYL ALCOHOL POLYMER

(71) Applicants: SEKISUI CHEMICAL CO., LTD., Osaka (JP); Sekisui Specialty Chemicals America, LLC, Dallas, TX (US)

(72) Inventors: Yohei Nishimura, Ibaraki (JP); Junichi Niino, Nagaokakyo (JP); Yasunari Kusaka, Osaka (JP); Nami Nakajima, Osaka (JP); Hidehiro Yamaguchi, Nobeoka (JP)

(73) Assignees: SEKISUI CHEMICAL CO., LTD., Osaka (JP); Sekisui Specialty Chemicals America, LLC, Pasadena, TX (US)

( * ) Notice: Subject to any disclaimer, the term of this patent is extended or adjusted under 35 U.S.C. 154(b) by 572 days.

(21) Appl. No.: 17/417,589

(22) PCT Filed: Dec. 26, 2019

(86) PCT No.: PCT/JP2019/051248
§ 371 (c)(1),
(2) Date: Jun. 23, 2021

(87) PCT Pub. No.: WO2020/138341
PCT Pub. Date: Jul. 2, 2020

(65) Prior Publication Data
US 2022/0056169 A1 Feb. 24, 2022

Related U.S. Application Data
(60) Provisional application No. 62/785,385, filed on Dec. 27, 2018.

(51) Int. Cl.
*C08F 16/06* (2006.01)
*C08F 2/18* (2006.01)
(Continued)

(52) U.S. Cl.
CPC ............... *C08F 16/06* (2013.01); *C08F 2/18* (2013.01); *C08F 2/20* (2013.01); *C08F 8/06* (2013.01); *C08F 14/06* (2013.01)

(58) Field of Classification Search
CPC .......................... C08F 16/06; C08F 2500/28
See application file for complete search history.

(56) References Cited

U.S. PATENT DOCUMENTS

2009/0253865 A1* 10/2009 Shibutani .................. C08F 8/14
525/59
2018/0044451 A1* 2/2018 Phung .................. C08F 116/06
2019/0300627 A1* 10/2019 Nishimura ............ C08F 114/06

FOREIGN PATENT DOCUMENTS

EP 0881240 * 12/1998
EP 1443060 A1 8/2004
(Continued)

OTHER PUBLICATIONS

Translation of JP2004-256637 (Year: 2004).*
(Continued)

*Primary Examiner* — Robert C Boyle
(74) *Attorney, Agent, or Firm* — Osha Bergman Watanabe & Burton LLP

(57) ABSTRACT

A vinyl alcohol-based polymer according to one embodiment of the present invention has an integral value (e) of 0.8 to 20 in the case when a sum of the following integral value (a) to (e) is 100 in a $^1$H-NMR spectrum
(a) integral value of peak confirmed at 5.70 to 5.96 ppm
(b) integral value of peak confirmed at 5.97 to 6.63 ppm
(c) integral value of peak confirmed at 6.64 to 7.55 ppm
(Continued)

(d) integral value of peak confirmed at 7.56 to 7.81 ppm
(e) integral value of peak confirmed at 7.82 to 8.04 ppm.

14 Claims, 7 Drawing Sheets

(51) Int. Cl.
    *C08F 2/20*    (2006.01)
    *C08F 8/06*    (2006.01)
    *C08F 14/06*   (2006.01)

(56) References Cited

FOREIGN PATENT DOCUMENTS

| | | | |
|---|---|---|---|
| JP | 2001-026604 A | | 1/2001 |
| JP | 2004-189889 A | | 7/2004 |
| JP | 2004-250695 A | | 9/2004 |
| JP | 2004-256637 | * | 9/2004 |
| JP | 2005-350557 A | | 12/2005 |
| JP | 2012-77185 A | | 4/2012 |
| JP | 2015-44923 A | | 3/2015 |
| JP | 2018-507311 A | | 3/2018 |
| WO | 2016/141256 A1 | | 9/2016 |
| WO | 2018/117245 A1 | | 6/2018 |
| WO | 2018/117246 A1 | | 6/2018 |
| WO | 2018/212207 A1 | | 11/2018 |

OTHER PUBLICATIONS

International Search Report issued in International Application No. PCT/JP2019/051248, mailed on Mar. 10, 2020 (7 pages).
Written Opinion issued in International Application No. PCT/JP2019/051248, mailed on Mar. 10, 2020 (4 pages).

* cited by examiner

VINYL ALCOHOL POLYMER AND METHOD FOR PRODUCING VINYL ALCOHOL POLYMER

TECHNICAL FIELD

The present invention relates to a vinyl alcohol-based polymer and a method for producing a vinyl alcohol-based polymer.

BACKGROUND ART

Polyvinyl chloride is generally produced by suspension polymerization of a vinyl chloride monomer. Suspension polymerization is often performed by dispersing a vinyl chloride monomer in water by using a dispersant such as polyvinyl alcohol. Dispersants have been examined from a variety of viewpoints, such as controlling foaming during polymerization, producing a polyvinyl chloride having a desired average particle size, and the like.

For example, Japanese Patent Laid-Open No. 2005-350557 (PTL 1) discloses that foaming during polymerization can be suppressed by using a dispersant for suspension polymerization containing a polyvinyl alcohol-based resin and a specific compound. In addition, Japanese Patent Laid-Open No. 2001-026604 (PTL 2) discloses that a polyvinyl chloride composed of the uniform porous particles can be obtained by using a dispersant for suspension polymerization of a vinyl compound composed of a modified polyvinyl alcohol containing 1 to 10 mol % of an α-olefin unit having 4 or less carbon atoms.

CITATION LIST

Patent Literature

PTL1: JP 2005-350557 A
PTL2: JP 2001-026604 A

SUMMARY OF INVENTION

Technical Problem

As the dispersant for suspension polymerization of the vinyl chloride monomer, in addition to the above-mentioned properties such as suppression of foaming during polymerization, it is desirable for the dispersant to be capable of increasing bulk density while controlling the average particle size of the formed polyvinyl chloride within an appropriate range. When the bulk density of the polyvinyl chloride is high, the volume of the container required for storage decreases, and when performing molding such as extrusion molding, processability is improved, for example molding speed is faster.

However, when a conventional dispersant for suspension polymerization is used, it is difficult to increase the bulk density while controlling the average particle size of the formed polyvinyl chloride in an appropriate range, and hence there is room for improvement.

It is an object of the present invention to provide a vinyl alcohol-based polymer, and a method for producing the vinyl alcohol-based polymer, that is capable of obtaining a polyvinyl chloride having an average particle size in an appropriate range and having a high bulk density.

Solution to Problem

The various embodiments of the present invention are as follows.

[1] A vinyl alcohol-based polymer, having a value defined by the following integral value (e) of 0.8 to 20 in the case when a sum of the following integral value (a) to (e) is 100 in a $^1$H-NMR spectrum.
(a) integral value of peak confirmed at 5.70 to 5.96 ppm
(b) integral value of peak confirmed at 5.97 to 6.63 ppm
(c) integral value of peak confirmed at 6.64 to 7.55 ppm
(d) integral value of peak confirmed at 7.56 to 7.81 ppm
(e) integral value of peak confirmed at 7.82 to 8.04 ppm

[2] The vinyl alcohol-based polymer according to [1], wherein a degree of saponification is 65 to 80 mol %, a block character of a remaining ester group is 0.45 to 0.62, and a ratio a1/a2 of an absorbance a1 of a 0.1 mass % aqueous solution at a wavelength of 280 nm and an absorbance a2 of the aqueous solution at a wavelength of 320 nm is 1.6 or less.

[3] The vinyl alcohol-based polymer according to [1] or [2], wherein a ratio (Mw/Mn) of a weight average molecular weight Mw to a number average molecular weight Mn is 2.6 to 14.

[4] The vinyl alcohol-based polymer according to any of [1] to [3], wherein a ratio of diad/triad of a remaining ester group is 0.7 to 1.3 and a ratio of diad/triad of a hydroxyl group is 2.0 to 3.5.

[5] The vinyl alcohol-based polymer according to any of [1] to [4], wherein a remaining ester group is an acetoxy group.

[6] The vinyl alcohol-based polymer according to any of [1] to [5], wherein a viscosity of a 4 mass % aqueous solution is 5 to 9 cP.

[7] The vinyl alcohol-based polymer according to any of [1] to [6], wherein a degree of yellowness (YI) of a 4 mass % aqueous solution is 30 to 80.

[8] The vinyl alcohol-based polymer according to any of [1] to [7], wherein when an aqueous solution having a concentration of the vinyl alcohol-based polymer of 7 mass % obtained by dissolving at 5° ° C. for 12 hours is filtered with a 200 mesh filter, a component remaining on the filter as undissolved matter is less than 0.1%.

[9] The vinyl alcohol-based polymer according to any of [1] to [8], which is used as a dispersant for polyvinyl chloride suspension polymerization.

[10] A method for producing a vinyl alcohol-based polymer, the method including at least the following steps (1) to (3):
Step (1) a step of polymerizing a vinyl ester monomer to produce a polyvinyl ester;
Step (2) a step of partially saponifying the polyvinyl ester to produce a partially saponified polyvinyl ester; and
Step (3) a step of melt-kneading the partially saponified polyvinyl ester at a heating temperature of 185 to 250° ° C. for a heating time of 1 to 10 minutes.

[11] The method for producing a vinyl alcohol-based polymer according to [10], wherein
the melt-kneading of step (3) is carried out in the presence of an oxidizing agent, and
an amount of the oxidizing agent blended is 2 parts by mass or less per 100 parts by mass of the polyvinyl ester.

[12] A resin particle composed of the vinyl alcohol-based polymer according to any of [1] to [9].

[13] The resin particle according to [12], wherein 95% or more of the particles have a particle size of 1.7 mm or more.

[14] A vinyl alcohol-based polymer, having a value defined by the following integral value (c) of 30 to 50 and a value defined by the following integral value (d) of 0.8 to 10 in the case when a sum of the following integral value (a) to (e) is 100 in a $^1$H-NMR spectrum.
(a) integral value of peak confirmed at 5.70 to 5.96 ppm
(b) integral value of peak confirmed at 5.97 to 6.63 ppm
(c) integral value of peak confirmed at 6.64 to 7.55 ppm
(d) integral value of peak confirmed at 7.56 to 7.81 ppm
(e) integral value of peak confirmed at 7.82 to 8.04 ppm

[15] A resin particle composed of the vinyl alcohol-based polymer according to [14].

[16] The resin particle according to [15], wherein 95% or more of the particles have a particle size of 1.7 mm or more.

Advantageous Effects of Invention

According to the present invention, a vinyl alcohol-based polymer, and a method for producing the vinyl alcohol-based polymer, that is capable of obtaining a polyvinyl chloride having an average particle size in an appropriate range and having a high bulk density can be provided.

DESCRIPTION OF EMBODIMENTS

[Vinyl Alcohol-Based Polymer]

Figure 1:
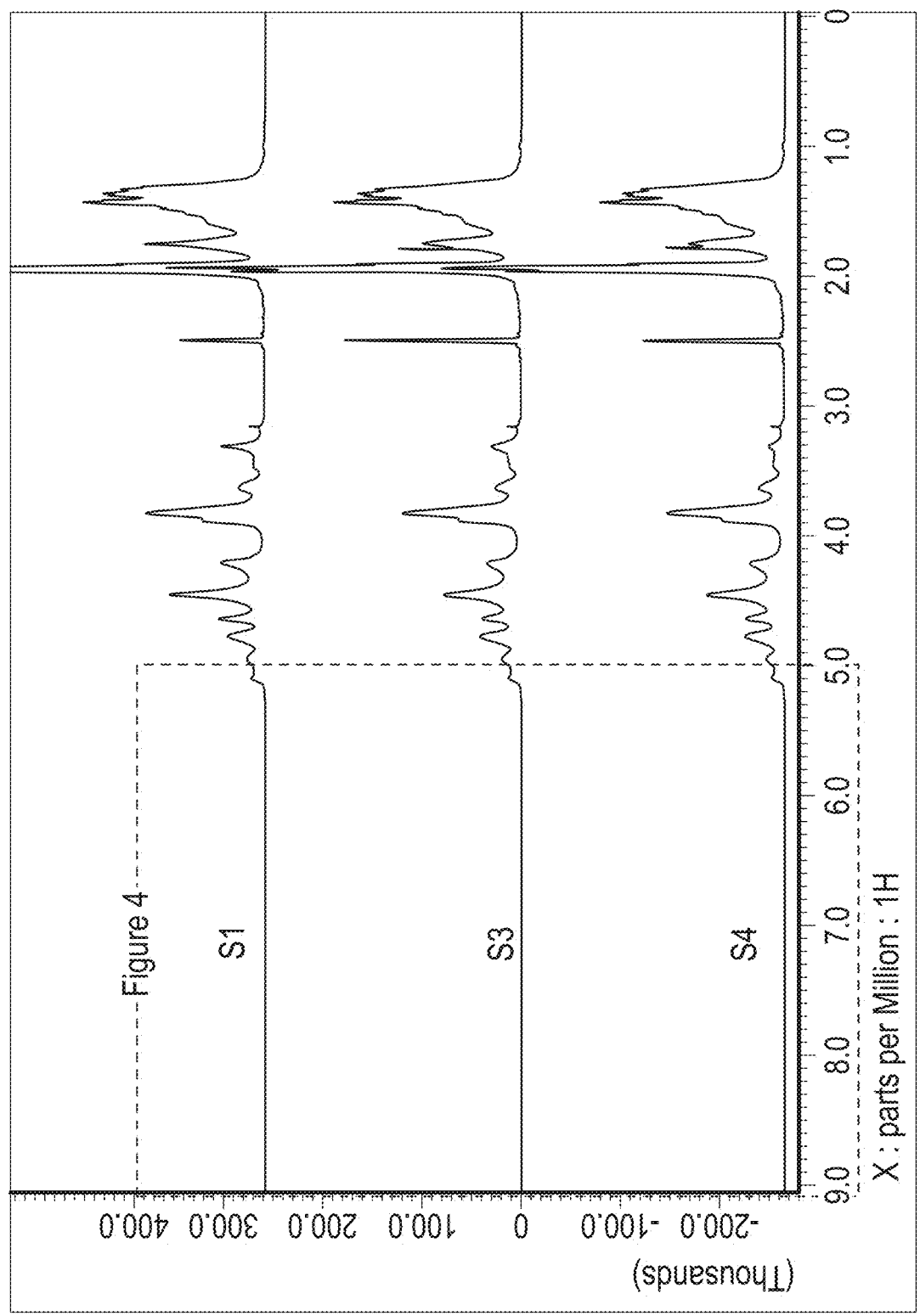
FIG. 1 shows the 1H-NMR spectrum of S1 to S4 obtained in each example.

In the vinyl alcohol-based polymer of the present invention according to one embodiment, in the case when a sum of the following integral value (a) to (e) in the $^1$H-NMR spectrum is 100, integral value (e) has a value in a specific range, or integral value (c) and (d) have a specific range. Preferably, all of integral value (a) to (e) have values in a specific range.
(a) integral value of peak confirmed at 5.70 to 5.96 ppm
(b) integral value of peak confirmed at 5.97 to 6.63 ppm
(c) integral value of peak confirmed at 6.64 to 7.55 ppm
(d) integral value of peak confirmed at 7.56 to 7.81 ppm
(e) integral value of peak confirmed at 7.82 to 8.04 ppm The vinyl alcohol-based polymer of the present invention according to one embodiment is produced through a step of partially saponifying a polyvinyl ester. The polyvinyl ester is a polymer of a vinyl ester monomer such as vinyl formate, vinyl acetate, vinyl propionate, vinyl butyrate, vinyl pivalate, and vinyl versatate.

The vinyl alcohol-based polymer produced through a step of partially saponifying a polyvinyl ester is represented by the following formula (1), and has structural units represented by (u1) to (u3).

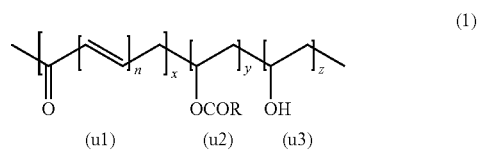

u1 is a structural unit having a carbonyl group and a double bond, u2 is a structural unit having a remaining ester group, and u3 is a structural unit having a hydroxyl group.

In the above formula, OCOR is a remaining ester group, x, y, and z each represent the mole fraction of the respective structural unit in the polymer, x+y+z=1, x, y, and z are each 0 to 1, and x, y, and z are not zero. In the above formula, an ester, a hydroxyl group, a carbonyl group, and a double bond adjacent to the carbonyl group are comprised in the molecular chain. The double bond is a single double bond or a conjugated double bond having two or more double bonds, and both of these may be present in the vinyl alcohol-based polymer. n is preferably 1 to 5, and more preferably 1 to 3.

The above-mentioned OCOR is a remaining ester group (O—C(=O)R), and R is a hydrogen atom or an alkyl group having 1 to 20 carbon atoms. In the present invention, it is preferable to use polyvinyl acetate as the polyvinyl ester, and in this case, the remaining ester group represents an acetoxy group.

The above integral value (a) to (e) in the $^1$H-NMR spectrum are peaks attributed to the proton (1H) bonded to the carbon of the double bond of the above formula (u1). The vinyl alcohol-based polymer of the present invention according to one embodiment is a vinyl alcohol-based polymer that has a specific type, number, arrangement, and the like of double structures, such as whether those structure are single or conjugated, due to the specific combination of integral value (a) to (e) or the feature that all of integral value (a) to (e) are within a specific numerical range. When a vinyl alcohol-based polymer having such specific structures is used as a dispersant for polyvinyl chloride suspension polymerization, polyvinyl chloride having an average particle size in an appropriate range and a high bulk density can be obtained.

According to a first aspect of the present invention, the vinyl alcohol-based polymer satisfies the following requirement (I).

[Requirement (I)] in the Case when the Sum of Integral Value (a) to (e) is 100, Integral Value (e) is 0.8 to 20.
(a) integral value of peak confirmed at 5.70 to 5.96 ppm
(b) integral value of peak confirmed at 5.97 to 6.63 ppm
(c) integral value of peak confirmed at 6.64 to 7.55 ppm
(d) integral value of peak confirmed at 7.56 to 7.81 ppm
(e) integral value of peak confirmed at 7.82 to 8.04 ppm When a vinyl alcohol-based polymer satisfying the above requirement (I) is used as a dispersant for polyvinyl chloride suspension polymerization, polyvinyl chloride having an average particle size in an appropriate range and a high bulk density can be obtained.

From the viewpoint of further increasing the bulk density and further improving the dispersibility of polyvinyl chloride, integral value (e) is preferably 0.8 to 15, more preferably 0.8 to 10, even more preferably 0.9 to 9, even more preferably 0.95 to 8, and especially preferably 1 to 7.

According to a second aspect of the present invention, the vinyl alcohol-based polymer satisfies the following requirement (II).

[Requirement (II)] in the Case when the Sum of Integral Value (a) to (e) is 100, Integral Value (c) is 30 to 50 and Integral Value (d) is 0.8 to 10.
- (a) integral value of peak confirmed at 5.70 to 5.96 ppm
- (b) integral value of peak confirmed at 5.97 to 6.63 ppm
- (c) integral value of peak confirmed at 6.64 to 7.55 ppm
- (d) integral value of peak confirmed at 7.56 to 7.81 ppm
- (e) integral value of peak confirmed at 7.82 to 8.04 ppm When a vinyl alcohol-based polymer satisfying the above requirement (II) is used as a dispersant for polyvinyl chloride suspension polymerization, polyvinyl chloride having an average particle size in an appropriate range and a high bulk density can be obtained.

In the above requirement (II), from the viewpoint of further increasing the bulk density and further improving the dispersibility of polyvinyl chloride, integral value (c) is preferably 30 to 45, more preferably 30 to 40, even more preferably 30 to 38, and even more preferably 30 to 37.

In the above requirement (II), from the viewpoint of further increasing the bulk density and further improving the dispersibility of polyvinyl chloride, integral value (d) is preferably 0.8 to 8, more preferably 0.8 to 7, even more preferably 0.8 to 0.6, even more preferably 0.9 to 5.5, and especially preferably 0.95 to 5.3.

For a vinyl alcohol-based polymer that does not satisfy either of requirement (I) or (II), it is difficult to obtain polyvinyl chloride having a high bulk density even when used as a dispersant for polyvinyl chloride suspension polymerization.

The vinyl alcohol-based polymer preferably further satisfies requirement (III).

[Requirement (III)] in the Case when the Sum of Integral Value (a) to (e) is 100, Integral Value (a) is 1 to 10 and Integral Value (b) is 20 to 70.
- (a) integral value of peak confirmed at 5.70 to 5.96 ppm
- (b) integral value of peak confirmed at 5.97 to 6.63 ppm
- (c) integral value of peak confirmed at 6.64 to 7.55 ppm
- (d) integral value of peak confirmed at 7.56 to 7.81 ppm
- (e) integral value of peak confirmed at 7.82 to 8.04 ppm In the above requirement (III), from the viewpoint of further increasing the bulk density and further improving the dispersibility of polyvinyl chloride, integral value (a) is preferably 1 to 8, more preferably 1 to 5, and even more preferably 1 to 4.

In the above requirement (III), from the viewpoint of further increasing the bulk density and further improving the dispersibility of polyvinyl chloride, integral value (b) is preferably 30 to 65, more preferably 40 to 65, even more preferably 45 to 63, even more preferably 48 to 60, and especially preferably 48 to 59.

From the viewpoint of further increasing the bulk density and further improving the dispersibility of polyvinyl chloride, it is preferable that the vinyl alcohol-based polymer of the present invention according to one embodiment satisfies both requirements (I) and (II), both requirements (I) and (III), or both requirements (II) and (III), and more preferably satisfies all of requirements (I), (II), and (III).

The above-mentioned integral value (a) to (e) can be adjusted according to the production conditions when producing the vinyl alcohol-based polymer. Specifically, as described later, integral value (a) to (e) can be adjusted according to production conditions, such as whether or not a peroxide is used, whether or not a heat treatment is carried out, the heating temperature, and the heat treatment time.

(Degree of Saponification)

The vinyl alcohol-based polymer of the present invention according to one embodiment preferably has a degree of saponification of 65 to 80 mol %. By setting the degree of saponification to such a range, it is easier to increase the bulk density of the polyvinyl chloride produced by using a vinyl alcohol-based polymer as a dispersant for polyvinyl chloride suspension polymerization. From the viewpoint of further improving the bulk density, the degree of saponification is more preferably 70 to 80 mol %.

Further, the degree of saponification can be measured in accordance with JIS K6726.

(Block Character)

The block character of the remaining ester group of the vinyl alcohol-based polymer of the present invention according to one embodiment is preferably 0.45 to 0.62, more preferably 0.45 to 0.6, even more preferably 0.45 to 0.55, and especially preferably 0.45 to 0.5. When the block character is such a value, it is easier to increase the bulk density of the polyvinyl chloride produced by using a vinyl alcohol-based polymer as a dispersant for polyvinyl chloride suspension polymerization.

Note that the block character is generally a value from 0 to 2. A value close to 0 indicates a high block-like shape of the distribution of the remaining ester group, a value close to 1 indicates high randomness, and a value close to 2 indicates high alternation.

The block character (n) of the remaining ester group is an index representing the distribution of the remaining ester group of the vinyl alcohol-based polymer, and is determined by analysis of the peaks appearing in the methine region in the 1H-NMR spectrum. The peaks are each split into three peaks depending on the structure of triad, in which adjacent substituent group is the hydroxyl group (O) or the remaining ester group (A). Specifically, at the center of the remaining ester group peaks, the peaks are split into (OAO), (AAO), and (AAA) peaks, and at the center of the hydroxyl group, the peaks are split into (OOO), (AOO), and (AOA) peaks. The absorption intensity is proportional to the abundance ratio of the structures. The block character (n) is represented by the following (Expression 1). Note that the remaining ester group (A) represents, for example, a remaining acetoxy group (OAc group), in the case when vinyl acetate is used as a raw material.

$$\eta = \frac{(OAO) + 0.5(AAO)}{(AAA) + (AAO) + (OAO)} + \frac{(AOA) + 0.5(AOO)}{(OOO) + (AOO) + (AOA)} \quad \text{(Expression 1)}$$

During NMR measurement, the solvent and moisture mixed in the sample may interfere, and the area of the spectrum may not be determined accurately. In such a case, 0.5 wt % of deuterated trifluoroacetic acid is added to the sample to shift the water peak, or the water peak is removed by adding a pulse sequence that saturates the water peak during NMR measurement.

Further, the details of the measurement and analysis are described in the prior art (Macromolecules, 1982, 15, 1071).

(UV Absorbance)

The vinyl alcohol-based polymer of the present invention according to one embodiment preferably has a ratio (a1/a2) between an absorbance a1 of a 0.1 mass % aqueous solution of the vinyl alcohol-based polymer at a wavelength of 280 nm and an absorbance a2 of a 0.1 mass % aqueous solution of the vinyl alcohol-based polymer at a wavelength of 320 nm that is adjusted in a fixed range.

As described above, the vinyl alcohol-based polymer of the present invention according to one embodiment has double bond. A part of the double bonds form a conjugated double bond along the polymer main chain adjacent to the carbonyl group, as shown in the following formulas (2) and (3).

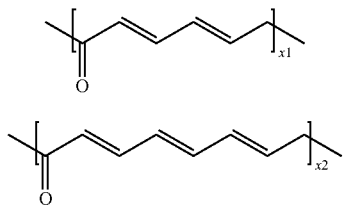

Formula (2) represents a conjugated double bond having two double bonds adjacent to the carbonyl group in the vinyl alcohol-based polymer, and formula (3) represents a conjugated double bond having three double bonds adjacent to the carbonyl group in the vinyl alcohol-based polymer. x1 of formula (2) and x2 of formula (3) each have the same meaning as x of formula (1).

The absorbance a1 at a wavelength of 280 nm is based on the conjugated double bond having two double bonds in proximity to the carbonyl group represented by the above formula (2). The greater the number of those conjugated double bonds, the higher the value of a1.

The absorbance a2 at a wavelength of 320 nm is based on the conjugated double bond having three double bonds in proximity to the carbonyl group represented by the above formula (3). The greater the number of those conjugated double bonds, the higher the value of a2.

The ratio a1/a2 between the absorbance a1 of a 0.1 mass % aqueous solution of the vinyl alcohol-based polymer of the present invention according to one embodiment at a wavelength of 280 nm and the absorbance a2 of a 0.1 mass % aqueous solution of the vinyl alcohol-based polymer at a wavelength of 320 nm is preferably 1.6 or less, and more preferably 1.5 or less, and is preferably 1.0 or more, more preferably 1.2 or more, and even more preferably 1.3 or more.

Using a vinyl alcohol-based polymer having a1/a2 in the above range as a dispersant for suspension polymerization makes it easier to obtain a bulky polyvinyl chloride.

From the viewpoint of improving the dispersibility of polyvinyl chloride, the absorbance a1 is preferably 0.15 to 0.70, and more preferably 0.20 to 0.60. From the viewpoint of improving the dispersibility of polyvinyl chloride, the absorbance a2 is preferably 0.10 to 0.50, and more preferably 0.15 to 0.40.

It is preferable that all of the above-mentioned degree of saponification, block character of the remaining ester group, and ratio a1/a2 between the absorbance a1 at 280 nm and the absorbance a2 at 320 nm of the vinyl alcohol-based polymer of the present invention according to one embodiment preferably be in the respective ranges as described above. These can be adjusted depending on the production conditions when producing the vinyl alcohol-based polymer described later, such as the polymerization conditions of the vinyl ester monomer, the partial saponification conditions, whether or not a peroxide is used, whether or not a heat treatment is carried out, the heating temperature, and the heat treatment time. The same applies to the adjustment of the various measurement values such as Mw/Mn, ratio of diad to triad, and viscosity, which are described later.

The ratio (Mw/Mn) of the weight average molecular weight Mw to the number average molecular weight Mn of the vinyl alcohol-based polymer of the present invention according to one embodiment is preferably 2.0 to 18, more preferably 2.6 to 14, and even more preferably 2.8 to 14.

The ratio of diad of a remaining ester group to triad of a remaining ester group (ratio of diad/triad) of the vinyl alcohol-based polymer of the present invention according to one embodiment is preferably 0.7 to 1.3. Here, triad of a remaining ester group refers to the proportion in the vinyl alcohol-based polymer of 3 constituent units having a remaining ester group present in series, and diad of a remaining ester group refers to the proportion in the vinyl alcohol-based polymer of 2 constituent units having a remaining ester group present in series.

The ratio of diad of a hydroxyl group to triad of a hydroxyl group of the vinyl alcohol-based polymer of the present invention according to one embodiment (ratio of diad/triad) is preferably 2.0 to 3.5, more preferably 2.1 to 3.3, and even more preferably 2.2 to 3.0. Here, triad of a hydroxyl group refers to the proportion in the vinyl alcohol-based polymer of 3 constituent units having a hydroxyl group present in series, and diad of a hydroxyl group refers to the proportion in the vinyl alcohol-based polymer of 2 constituent units having a hydroxyl group present in series.

Each of these diad and triad is determined by $^1$H-NMR measurement. Specifically, these can each be calculated based on the ratio of the integral value of each peak by 400 MHz 1H-NMR measurement at room temperature of a 1.0 wt % DMSO-d6 solution of the target sample.

More specifically, when the peak integral value of each chemical shift is defined as described below, the calculation is performed using the following formula. Here, there is described a case in which the remaining ester group is an acetyl group. Hereinafter O represents a hydroxyl group, A represents an acetyl group, and underlining represents the substituent groups to be integrated.

[O$\underline{A}$O] (Relative amount of acetyl groups sandwiched between hydroxyl groups): 5.04-5.19 ppm

[A$\underline{A}$O+O$\underline{A}$A] (Relative amount of acetyl groups sandwiched between a hydroxyl group and an acetyl group): 4.90 to 5.05 ppm

[A$\underline{A}$A] (Relative amount of acetyl groups sandwiched between acetyl groups): 4.69-4.91 ppm

[O$\underline{O}$O] (Relative amount of hydroxyl groups sandwiched between hydroxyl groups): 3.75 to 4.15 ppm

[A$\underline{O}$O+O$\underline{O}$A] (Relative amount of hydroxyl groups sandwiched between hydroxyl group and acetyl group): 3.60-3.76 ppm

[A$\underline{O}$A] (Relative amount of hydroxyl group sandwiched between acetyl groups): 3.34-3.61 ppm Diad/triad of remaining ester group=([A$\underline{AA}$]+0.5[A$\underline{A}$O+O$\underline{A}$A])/([O$\underline{A}$O]+0.5[A$\underline{A}$O+O$\underline{AA}$])

Diad/triad of hydroxyl group=([O$\underline{OO}$]+0.5[A$\underline{O}$O+O$\underline{O}$A])/([A$\underline{O}$A]+0.5[A$\underline{O}$O+O$\underline{OA}$])

It is preferable that, when an aqueous solution having a concentration of the vinyl alcohol-based polymer of the present invention according to one embodiment of 7 mass % obtained by dissolving at 5°C for 12 hours is filtered with a 200 mesh filter, a component remaining on the filter as undissolved matter be less than 0.1%. A vinyl alcohol-based polymer having such a small amount of undissolved matter has excellent solubility, and excellent handleability as a dispersant.

The viscosity of the vinyl alcohol-based polymer of the present invention according to one embodiment is not particularly limited, and from the viewpoint of suspension stability and the like, the viscosity of a 4 mass % aqueous solution of the vinyl alcohol-based polymer is preferably 5 to 9 cP, and more preferably 6 to 7.5 cP. The viscosity is the value measured at 20° C., and the measurement of the viscosity can be carried out using a Brookfield viscometer (model LVDV-II+Pro).

The degree of yellowness (YI) of a 4 mass % aqueous solution of the vinyl alcohol-based polymer of the present invention according to one embodiment is preferably 30 to 80, and more preferably 35 to 70. The degree of yellowness (YI) is correlated with the conjugated double bond component in which n in the above formula (1) is 4 or more. In the case when the degree of yellowness (YI) is 30 or more, the grafting efficiency of the vinyl chloride monomer during the polyvinyl chloride polymerization reaction is increased, which makes it easier to control to the desired particle size and bulk density. In the case when the degree of yellowness (YI) is 80 or less, side reactions do not proceed too much, the vinyl alcohol-based polymer dissolves more easily in water, and production efficiency is improved. Further, the degree of yellowness (YI) can be determined in accordance with ASTM Standard D1925.

The vinyl alcohol-based polymer of the present invention according to one embodiment is preferably formed from resin particles composed of the vinyl alcohol-based polymer. A polyvinyl chloride obtained by using such resin particles as a dispersant for polyvinyl chloride suspension polymerization is of a good quality with little occurrence of undissolved lumps of flour (lumps, chunks).

The average particle size of the resin particles is preferably 0.8 to 3.0 mm, and in terms of weight ratio, preferably 95% or more of the particles have a particle size of 1.7 mm or more. In the case when the average particle size of the resin particles is 0.8 mm or more, coalescence of the resin particles at the time of dissolution is suppressed, and undissolved lumps of flour are less likely to occur. In addition, when the average particle size of the resin particles is 3.0 mm or less, the resin particles are completely dissolved in a short time, and as a result, the productivity of the polyvinyl chloride polymerization can be improved. The weight ratio of particles having a particle size of 1.7 mm or more can be measured by placing 100 g of the resin particles on a sieve having a mesh diameter of 1.7 mm, covering with a lid, shaking for 5 minutes, and evaluating the weight ratio of the resin remaining on the sieve and the resin that passed through the sieve.

The method for producing the resin particles is not particularly limited, and the resin particles can be produced by, as described later, extruding the vinyl alcohol-based polymer in strands with an extruder, performing air-cooling, and then pelletizing by cutting with a strand cutter.

The vinyl alcohol-based polymer of the present invention according to one embodiment and the resin particles composed of the vinyl alcohol-based polymer can be suitably used as a dispersant for polyvinyl chloride suspension polymerization.

Although the method for producing the vinyl alcohol-based polymer of the present invention according to one embodiment is not limited, it is preferable that the polyvinyl alcohol be produced by a production method including the following steps (1) to (3).

Step (1) A step of polymerizing a vinyl ester monomer to produce a polyvinyl ester.
Step (2) A step of partially saponifying the polyvinyl ester to produce a partially saponified polyvinyl ester.
Step (3) A step of melt-kneading the partially saponified polyvinyl ester at a heating temperature of 185 to 250° C. for a heating time of 1 to 10 minutes.

Step (1) is a step of polymerizing a vinyl ester monomer to produce a polyvinyl ester.

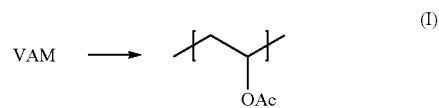

The above reaction formula (I) is a simplified reaction formula used to explain step (1), and it shows the reaction formula when vinyl acetate (VAM) is used as the vinyl ester monomer. Ac represents an acetyl group.

In step (1), examples of the vinyl ester monomer include vinyl formate, vinyl acetate, vinyl propionate, vinyl butyrate, vinyl pivalate, and vinyl versatate. The vinyl ester monomers may be used singly or in combinations of two or more. Among these, it is preferable to use at least vinyl acetate, and it is more preferable to use only vinyl acetate.

The polymerization can be carried out in a state substantially free from the presence of olefin comonomers such as ethylene, propylene, and styrene. The polymerization can also be carried out in a state free from or substantially free from chain transfer agents such as aldehydes, and ketones. Here, substantially free means that the substance in question is not intentionally added.

Examples of the polymerization method include known methods, such as bulk polymerization, solution polymerization, suspension polymerization, and emulsion polymerization. The polymerization can be carried out at about −80 to 300° C., and a polymerization initiator such as a peroxide or azoisobutyronitrile can be used.

Step (2) is a step of partially saponifying the polyvinyl ester obtained in step (1) to produce a partially saponified polyvinyl ester.

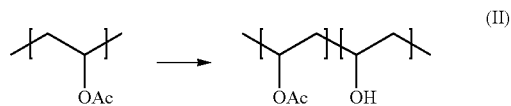

The above reaction formula (II) is a simplified reaction formula used to explain the step (2), and it shows the reaction formula of step (2) when vinyl acetate (VAM) is used as the vinyl ester monomer. In step (2), a part of the ester groups are saponified to convert to hydroxyl groups.

The reaction temperature in step (2) is, for example, about 10 to 70° C., and preferably about 20 to 50° C.

The partial saponification can be carried out by bringing the polyvinyl ester into contact with an alkali compound to cause transesterification or direct hydrolysis. Examples of the alkali compound include alkali metal hydroxides such as potassium hydroxide, sodium hydroxide, and lithium hydroxide, and alkali metal alkoxides such as sodium methoxide, sodium ethoxide, potassium methoxide, potassium ethoxide, and potassium t-butoxide, and the like.

The amount of the alkali compound used is not particularly limited, and it is preferably 0.0005 to 0.01 mol, and more preferably 0.001 to 0.003 mol, per mole of the polyvinyl ester.

Examples of solvents that can be used in the partial saponification include alcohols such as methanol, ethanol, isopropanol, n-propyl alcohol, n-butanol, isobutanol, sec-butanol, t-butanol, amyl alcohol, and cyclohexanol, cyclic ethers such as tetrahydrofuran and dioxane, ketones such as acetone, methyl ethyl ketone, methyl isobutyl ketone, and pinacholine, sulfoxides such as dimethyl sulfoxide, hydrocarbons such as toluene, benzene, n-hexane, and cyclohexane, and the like.

The partially saponified polyvinyl ester is preferably isolated and dried to obtain a powdery partially saponified polyvinyl ester for further processing.

(Step 3)

Step (3) is a step of melt-kneading the partially saponified polyvinyl ester at a heating temperature of 185 to 250° C. for a heating time of 1 to 10 minutes.

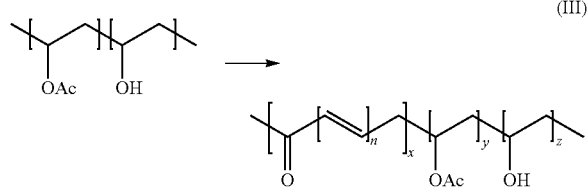

(III)

The above reaction formula (III) is a simplified reaction formula used to explain step (3), and it shows the reaction formula of step (3) when vinyl acetate (VAM) is used as the vinyl ester monomer. In the above reaction formula, OAc represents an acetoxy group, x, y, and z each represent the mole fraction of the respective structural unit in the polymer, $x+y+z=1$, x, y, and z are each 0 to 1, and x, y, and z are not zero.

In step (3), a double bond and a carbonyl group are introduced into the polymer main chain. The double bond is a single double bond or a conjugated double bond having two or more double bonds, and both of these may be present in the vinyl alcohol-based polymer. n is preferably 1 to 5, and more preferably 1 to 3.

In step (3), the partially saponified polyvinyl ester obtained in step (2) is melt-kneaded at a heating temperature of 185 to 250° C. for a heating time of 1 to 10 minutes. By performing the melt-kneading at a heating temperature of 185° C. or more, the values of the above (a) to (e) in the 1H-NMR spectrum can be more easily adjusted to the above-described desired range. By setting the heating temperature to 250° C. or less, the undissolved matter in the vinyl alcohol-based polymer tends to be reduced. From such a viewpoint, the heating temperature is preferably 190 to 245° C., and the heating time is preferably 2 to 8 minutes.

The means for performing the melt-kneading is not particularly limited, and it is preferable to perform the melt-kneading with an extruder. The extruder may be a single-screw extruder or a twin-screw extruder, but it is preferable to use a twin-screw extruder. When a twin-screw extruder is used, it is easier to melt and knead the powdery partially saponified polyvinyl ester obtained in step (2), and it is easier to obtain the desired vinyl alcohol-based polymer.

In addition, the melt-kneading is preferably performed in the presence of an oxidizing agent. By performing the melt-kneading in the presence of an oxidizing agent, the values of the above (a) to (e) in the $^1$H-NMR spectrum can be more easily adjusted to the above-described desired range. The addition of the oxidizing agent is preferably performed before adjusting to the above-described heating temperature. Specifically, it is preferable to add the oxidizing agent to the partially saponified polyvinyl ester, and then carry out the heat treatment under the above-described conditions of the heating temperature and heating time. The amount of the oxidizing agent blended is preferably 2 parts by mass or less, and more preferably 1 part by mass or less, and is preferably 0.1 parts by mass or more, per 100 parts by mass of the polyvinyl ester.

Further, the oxidizing agent can also be added by diluting in a solvent such as water, methanol, or methyl acetate. In such a case, it is preferable to add oxidizing agent as an aqueous solution. The addition of the oxidizing agent is not particularly limited, and in consideration of the half-life temperature of the oxidizing agent, is preferably performed while kneading at a temperature of 10° C. to less than 185° C. In the case of diluting the oxidizing agent in a solvent, in consideration the boiling point of the solvent, it is preferable to add at a temperature equal to or lower than the boiling point of the solvent, and particularly in the case of an aqueous solution, it is preferable to add at 100° C. or lower.

In the case of using an extruder, it is preferable to add the oxidizing agent through an oxidizing agent inlet port that has been provided in the extruder.

Examples of the oxidizing agent include various acids, peroxides, perchlorates, chlorinated isocyanurates, and the like. Among these, as the oxidizing agent, peroxide oxidizing agents such as hydrogen peroxide and peracetic acid are preferable, and hydrogen peroxide is more preferable.

In step (3), esters such as methyl acetate, carboxylic acids such as acetic acid, water, and the like, which are by-products of the reaction, may be removed as necessary. For example, when melt-kneading using an extruder, an extruder equipped with a vacuum vent may be used.

By carrying out steps (1) to (3), the vinyl alcohol-based polymer of the present invention according to one embodiment is obtained. In the case when step (3) is carried out with an extruder, it is preferable to extrude the vinyl alcohol-based polymer into strands with the extruder, perform air cooling, and then cut and pelletize with a strand cutter to obtain resin particles.

The polyvinyl chloride obtained by using the resin particles as a dispersant for polyvinyl chloride suspension polymerization is of a good quality with little occurrence of undissolved lumps of flour (lumps, chunks).

(Method for Producing Polyvinyl Chloride)

The vinyl alcohol-based polymer of the present invention according to one embodiment can be used as a dispersant for polyvinyl chloride suspension polymerization. The method for producing polyvinyl chloride using the vinyl alcohol-based polymer as a dispersant may be carried out as follows, for example.

A step of mixing the vinyl alcohol-based polymer of the present invention according to one embodiment, the vinyl chloride monomer, and water to form a suspension may be carried out, and then a step of polymerizing the vinyl chloride monomer may be carried out.

Although the order in which the vinyl alcohol-based polymer, the vinyl chloride monomer, and the water are added is not particularly limited, for example, the vinyl alcohol-based polymer may be added and mixed with a solution including the vinyl chloride monomer and water to form a suspension. The mixing can be carried out by using a known stirring device.

The amount of the vinyl alcohol-based polymer used is preferably 0.01 to 5 mass %, and more preferably 0.02 to 0.2 mass %, based on the vinyl chloride monomer.

In addition, dispersants other than the vinyl alcohol-based polymer of the present invention according to one embodiment may be used in combination with the vinyl alcohol-based polymer of the present invention according to one embodiment. Examples of other dispersants include cellulose, cellulose derivatives, and the like. Examples of cellulose derivatives include methyl cellulose, ethyl cellulose, hydroxymethyl cellulose, hydroxypropyl methylcellulose, hydroxybutyl methylcellulose, hydroxyethyl cellulose, carboxymethyl cellulose, and the like. Further, a vinyl alcohol-based polymer other than the vinyl alcohol-based polymer of the present invention according to one embodiment may be used as another dispersant. The proportion of the vinyl alcohol-based polymer of the present invention according to one embodiment relative to the total dispersant mass is preferably 60 mass % or more, and more preferably 80 mass % or more, and even more preferably 90 mass % or more.

The vinyl chloride monomer may be blended all at one time in the amount to be used in the polymerization, or a portion may be added first and the remainder may be added after the polymerization has started.

The suspension may further contain one or more kinds of additives, such as a polymerization initiator, an antioxidant, and a pH regulator.

Examples of the polymerization initiator include di-2-ethylhexyl peroxydicarbonate, diethoxyethyl peroxydicarbonate, α-cumyl peroxyneodecanoate, t-butyl peroxyneodecanoate, t-butyl peroxypivalate, t-butyl peroxy-3,5,5-trimethylhexanoate, acetylcyclohexylsulfonyl peroxide, 2,4,4-trimethylpentyl-2-peroxyphenoxy acetate, lauroyl peroxide, and the like. These may be used singly or in combinations of two or more.

Examples of the antioxidant include hindered phenol antioxidants.

Examples of pH regulators include sodium bicarbonate, sodium carbonate, potassium bicarbonate, potassium carbonate, sodium citrate, potassium citrate, sodium tartrate, potassium tartrate, sodium benzoate, potassium benzoate, and the like. These may be used singly or in combinations of two or more.

After the suspension is formed as described above, the suspension is heated to polymerize the vinyl chloride monomer. The temperature during polymerization is about 20 to 90° C. After polymerization has started, additional vinyl chloride monomer can be further added.

The average particle size of the obtained polyvinyl chloride is preferably 130 to 180 μm, and more preferably 140 to 160 μm. Polyvinyl chloride having such an average particle size is excellent in handling performance.

When the vinyl alcohol-based polymer of the present invention according to one embodiment is used as a dispersant, it is possible to obtain polyvinyl chloride having a high bulk density.

EXAMPLES

The present invention is now illustrated in more detail by referring to the following Examples. However, the present invention is not limited to these.

Example 1

In a reactor equipped with a thermometer, a stirrer, and a condenser, 100 parts by weight of vinyl acetate monomer and 40 parts by weight of methanol were added, and nitrogen gas was blown for 30 minutes to purge the reactor with nitrogen. The reactor was then heated at 60° ° C. for 30 minutes. Next, 0.03 parts by weight of 2-ethylhexylperoxydicarbonate as a polymerization initiator was added, and the mixture was reacted at 60°C for 4 hours. After completion of the reaction time, the reaction solution was cooled. When the polymerization rate was measured after cooling, the reaction rate was 40%. Next, an operation for removing remaining vinyl acetate monomer together with methanol was carried out under reduced pressure while adding methanol to obtain a methanol solution containing 50 wt % of polyvinyl acetate. This methanol solution was charged with a solution of sodium hydroxide in methanol such that the amount of sodium hydroxide was 0.003 mol per mol of polyvinyl acetate, and saponification was performed at 40° C. After distilling off the solvent, the mixture was dried to obtain a powdery partially saponified polyvinyl acetate.

The obtained powdery partially saponified polyvinyl acetate was fed into a twin-screw extruder using a feeder, and kneaded at room temperature to less than 185° C. While kneading under such conditions, an aqueous hydrogen peroxide solution (concentration of 30 mass %) was fed from the input port provided on the barrel and mixed with the partially saponified polyvinyl acetate. The amount of the hydrogen peroxide added was adjusted so as to be 0.3 parts by mass per 100 parts by mass of polyvinyl acetate.

After the aqueous hydrogen peroxide solution had been fed, the mixture was melt-kneaded under conditions of a heating temperature of 242° C. and a heating time of 7.5 minutes to obtain the vinyl alcohol-based polymer of the present invention. The vinyl alcohol-based polymer was extruded into strands by an extruder, air-cooled, and then cut by a strand cutter to obtain resin particles S1 composed of a vinyl alcohol-based polymer.

Various evaluations to be described later were performed on the S1. The results are shown in Table 1.

Example 2

In a reactor equipped with a thermometer, a stirrer, and a condenser, 100 parts by weight of vinyl acetate monomer and 40 parts by weight of methanol were added, and nitrogen gas was blown for 30 minutes to purge the reactor with nitrogen. The reactor was then heated at 60°C for 30 minutes. Next, 0.03 parts by weight of 2-ethylhexylperoxydicarbonate as a polymerization initiator was added, and the mixture was reacted at 60° C. for 4 hours. After completion of the reaction time, the reaction solution was cooled. When the polymerization rate was measured after cooling, the reaction rate was 40%. Next, an operation for removing remaining vinyl acetate monomer together with methanol was carried out under reduced pressure while adding methanol to obtain a methanol solution containing 50 wt % of polyvinyl acetate. This methanol solution was charged with a solution of sodium hydroxide in methanol such that the amount of sodium hydroxide was 0.003 mol per mol of polyvinyl acetate, and saponification was performed at 40° C. After distilling off the solvent, the mixture was dried to obtain a powdery partially saponified polyvinyl acetate.

The obtained powdery partially saponified polyvinyl acetate was fed into a twin-screw extruder using a feeder, and kneaded at room temperature to less than 185° C. While kneading under such conditions, an aqueous hydrogen peroxide solution (concentration of 30 mass %) was fed from the input port provided on the barrel and mixed with the partially saponified polyvinyl acetate. The amount of the hydrogen peroxide added was adjusted so as to be 0.6 parts by mass per 100 parts by mass of polyvinyl acetate.

After the aqueous hydrogen peroxide solution had been fed, the mixture was melt-kneaded under conditions of a heating temperature of 197°C and a heating time of 6 minutes to obtain the vinyl alcohol-based polymer of the present invention. The vinyl alcohol-based polymer was extruded into strands by an extruder, air-cooled, and then cut by a strand cutter to obtain resin particles S3 composed of a vinyl alcohol-based polymer.

Various evaluations to be described later were performed on the S3. The results are shown in Table 1.

Example 3

In a reactor equipped with a thermometer, a stirrer, and a condenser, 100 parts by weight of vinyl acetate monomer and 40 parts by weight of methanol were added, and nitrogen gas was blown for 30 minutes to purge the reactor with nitrogen. The reactor was then heated at 60°C for 30 minutes. Next, 0.03 parts by weight of 2-ethylhexylperoxydicarbonate as a polymerization initiator was added, and the mixture was reacted at 60°C for 4 hours. After completion of the reaction time, the reaction solution was cooled. When the polymerization rate was measured after cooling, the reaction rate was 40%. Next, an operation for removing remaining vinyl acetate monomer together with methanol was carried out under reduced pressure while adding methanol to obtain a methanol solution containing 50 wt % of polyvinyl acetate. This methanol solution was charged with a solution of sodium hydroxide in methanol such that the amount of sodium hydroxide was 0.003 mol per mol of polyvinyl acetate, and saponification was performed at 40° C. After distilling off the solvent, the mixture was dried to obtain a powdery partially saponified polyvinyl acetate.

The obtained powdery partially saponified polyvinyl acetate was fed into a twin-screw extruder using a feeder, and kneaded at room temperature to less than 185° C. While kneading under such conditions, an aqueous hydrogen peroxide solution (concentration of 30 mass %) was fed from the input port provided on the barrel and mixed with the partially saponified polyvinyl acetate. The amount of the hydrogen peroxide added was adjusted so as to be 0.3 parts by mass per 100 parts by mass of polyvinyl acetate.

After the aqueous hydrogen peroxide solution had been fed, the mixture was melt-kneaded under conditions of a heating temperature of 199°C and a heating time of 6 minutes to obtain the vinyl alcohol-based polymer of the present invention. The vinyl alcohol-based polymer was extruded into strands by an extruder, air-cooled, and then cut by a strand cutter to obtain resin particles S4 composed of a vinyl alcohol-based polymer.

Various evaluations to be described later were performed on the S4. The results are shown in Table 1.

Example 4

In a reactor equipped with a thermometer, a stirrer, and a condenser, 100 parts by weight of vinyl acetate monomer and 40 parts by weight of methanol were added, and nitrogen gas was blown for 30 minutes to purge the reactor with nitrogen. The reactor was then heated at 60°C for 30 minutes. Next, 0.03 parts by weight of 2-ethylhexylperoxydicarbonate as a polymerization initiator was added, and the mixture was reacted at 60°C for 4 hours. After completion of the reaction time, the reaction solution was cooled. When the polymerization rate was measured after cooling, the reaction rate was 40%. Next, an operation for removing remaining vinyl acetate monomer together with methanol was carried out under reduced pressure while adding methanol to obtain a methanol solution containing 50 wt % of polyvinyl acetate. This methanol solution was charged with a solution of sodium hydroxide in methanol such that the amount of sodium hydroxide was 0.003 mol per mol of polyvinyl acetate, and saponification was performed at 40° C. After distilling off the solvent, the mixture was dried to obtain a powdery partially saponified polyvinyl acetate.

The obtained powdery partially saponified polyvinyl acetate was fed into a twin-screw extruder using a feeder, and kneaded at room temperature to less than 185° C. While kneading under such conditions, an aqueous hydrogen peroxide solution (concentration of 30 mass %) was fed from the input port provided on the barrel and mixed with the partially saponified polyvinyl acetate. The amount of the hydrogen peroxide added was adjusted so as to be 0.6 parts by mass per 100 parts by mass of polyvinyl acetate.

After the aqueous hydrogen peroxide solution had been fed, the mixture was melt-kneaded under conditions of a heating temperature of 193°C and a heating time of 6 minutes to obtain the vinyl alcohol-based polymer of the present invention. The vinyl alcohol-based polymer was extruded into strands by an extruder, air-cooled, and then cut by a strand cutter to obtain resin particles S5 composed of a vinyl alcohol-based polymer.

Various evaluations to be described later were performed on the S5. The results are shown in Table 1.

Example 5

In a reactor equipped with a thermometer, a stirrer, and a condenser, 100 parts by weight of vinyl acetate monomer and 40 parts by weight of methanol were added, and nitrogen gas was blown for 30 minutes to purge the reactor with nitrogen. The reactor was then heated at 60°C for 30 minutes. Next, 0.03 parts by weight of 2-ethylhexylperoxydicarbonate as a polymerization initiator was added, and the mixture was reacted at 60° C. for 4 hours. After completion of the reaction time, the reaction solution was cooled. When the polymerization rate was measured after cooling, the reaction rate was 40%. Next, an operation for removing remaining vinyl acetate monomer together with methanol was carried out under reduced pressure while adding methanol to obtain a methanol solution containing 50 wt % of polyvinyl acetate. This methanol solution was charged with a solution of sodium hydroxide in methanol such that the amount of sodium hydroxide was 0.003 mol per mol of polyvinyl acetate, and saponification was performed at 40° C. After distilling off the solvent, the mixture was dried to obtain a powdery partially saponified polyvinyl acetate.

The obtained powdery partially saponified polyvinyl acetate was fed into a twin-screw extruder using a feeder, and kneaded at room temperature to less than 185° C. While kneading under such conditions, an aqueous hydrogen peroxide solution (concentration of 30 mass %) was fed from the input port provided on the barrel and mixed with the partially saponified polyvinyl acetate. The amount of the hydrogen peroxide added was adjusted so as to be 0.44 parts by mass per 100 parts by mass of polyvinyl acetate.

After the aqueous hydrogen peroxide solution had been fed, the mixture was melt-kneaded under conditions of a heating temperature of 210° C. and a heating time of 6 minutes to obtain the vinyl alcohol-based polymer of the present invention. The vinyl alcohol-based polymer was extruded into strands by an extruder, air-cooled, and then cut by a strand cutter to obtain resin particles S6 composed of a vinyl alcohol-based polymer.

Various evaluations to be described later were performed on the S6. The results are shown in Table 1.

Example 6

In a reactor equipped with a thermometer, a stirrer, and a condenser, 100 parts by weight of vinyl acetate monomer and 40 parts by weight of methanol were added, and nitrogen gas was blown for 30 minutes to purge the reactor with nitrogen. The reactor was then heated at 60°C for 30 minutes. Next, 0.03 parts by weight of 2-ethylhexylperoxydicarbonate as a polymerization initiator was added, and the mixture was reacted at 60° ° C. for 4 hours. After completion of the reaction time, the reaction solution was cooled. When the polymerization rate was measured after cooling, the reaction rate was 40%. Next, an operation for removing remaining vinyl acetate monomer together with methanol was carried out under reduced pressure while adding methanol to obtain a methanol solution containing 50 wt % of polyvinyl acetate. This methanol solution was charged with a solution of sodium hydroxide in methanol such that the amount of sodium hydroxide was 0.003 mol per mol of polyvinyl acetate, and saponification was performed at 40° C. After distilling off the solvent, the mixture was dried to obtain a powdery partially saponified polyvinyl acetate.

The obtained powdery partially saponified polyvinyl acetate was fed into a twin-screw extruder using a feeder, and kneaded at room temperature to less than 185° C. While kneading under such conditions, an aqueous hydrogen peroxide solution (concentration of 30 mass %) was fed from the input port provided on the barrel and mixed with the partially saponified polyvinyl acetate. The amount of the hydrogen peroxide added was adjusted so as to be 0.8 parts by mass per 100 parts by mass of polyvinyl acetate.

After the aqueous hydrogen peroxide solution had been fed, the mixture was melt-kneaded under conditions of a heating temperature of 209° C. and a heating time of 6 minutes to obtain the vinyl alcohol-based polymer of the present invention. The vinyl alcohol-based polymer was extruded into strands by an extruder, air-cooled, and then cut by a strand cutter to obtain resin particles S7 composed of a vinyl alcohol-based polymer.

Various evaluations to be described later were performed on the S7. The results are shown in Table 1.

Comparative Example 1

Various evaluations described later were performed on "Alcotex B72" (sample name C1), manufactured by Synthomer plc, which is a vinyl alcohol-based polymer. The results are shown in Table 2.

Comparative Example 2

Various evaluations to be described later were performed on "Kuraray L8" (sample name C2), manufactured by Kuraray Co., Ltd., which is a vinyl alcohol-based polymer. The results are shown in Table 2.

Comparative Example 3

In a reactor equipped with a thermometer, a stirrer, and a condenser, 100 parts by weight of vinyl acetate monomer and 20 parts by weight of methanol were added, and nitrogen gas was blown for 30 minutes to purge the reactor with nitrogen. The reactor was then heated at 60° C. for 30 minutes. Next, 0.01 parts by weight of 2-ethylhexylperoxydicarbonate as a polymerization initiator was added, and the mixture was reacted at 64° C. for 4.5 hours. After completion of the reaction time, the reaction solution was cooled. When the polymerization rate was measured after cooling, the reaction rate was 52%. Next, an operation for removing remaining vinyl acetate monomer together with methanol was carried out under reduced pressure while adding methanol to obtain a methanol solution containing 53 wt % of polyvinyl acetate. This methanol solution was charged with a solution of sodium hydroxide in methanol such that the amount of sodium hydroxide was 0.015 mol per mol of polyvinyl acetate, and saponification was performed at 42° C. After distilling off the solvent, the mixture was dried to obtain a powdery partially saponified polyvinyl acetate.

The obtained powdery partially saponified polyvinyl acetate was fed into a twin-screw extruder using a feeder, and kneaded at room temperature to 165° C. While kneading under such conditions, glycerin (concentration of 98 mass %) was fed from the input port provided on the barrel and mixed with the partially saponified polyvinyl acetate. The amount of the glycerin added was adjusted so as to be 9.3 parts by mass per 100 parts by mass of polyvinyl acetate.

After the glycerin had been fed, the mixture was melt-kneaded under conditions of a heating temperature of 180° C. and a heating time of 4 minutes to obtain a vinyl alcohol-based polymer. The vinyl alcohol-based polymer was extruded into strands by an extruder, air-cooled, and then cut by a strand cutter to obtain resin particles C3 composed of a vinyl alcohol-based polymer. Various evaluations to be described later were performed on the C3. The results are shown in Table 2.

Comparative Example 4

In a reactor equipped with a thermometer, a stirrer, and a condenser, 100 parts by weight of vinyl acetate monomer and 40 parts by weight of methanol were added, and nitrogen gas was blown for 30 minutes to purge the reactor with nitrogen. The reactor was then heated at 60° C. for 30 minutes. Next, 0.03 parts by weight of 2-ethylhexylperoxydicarbonate as a polymerization initiator was added, and the mixture was reacted at 60° C. for 4 hours. After completion of the reaction time, the reaction solution was cooled. When the polymerization rate was measured after cooling, the reaction rate was 40%. Next, an operation for removing remaining vinyl acetate monomer together with methanol was carried out under reduced pressure while adding methanol to obtain a methanol solution containing 50 wt % of polyvinyl acetate. This methanol solution was charged with a solution of sodium hydroxide in methanol such that the amount of sodium hydroxide was 0.003 mol per mol of polyvinyl acetate, and saponification was performed at 40° C. After distilling off the solvent, the mixture was dried to obtain a powdery partially saponified polyvinyl acetate.

The obtained powdery partially saponified polyvinyl acetate was fed into a twin-screw extruder ("BTN-90" manufactured by Research Laboratory of Plastics Technology Co., Ltd) using a feeder, and kneaded at room temperature to less than 220° C. While kneading under such conditions, an aqueous hydrogen peroxide solution (concentration of 30 mass %) was fed from the input port provided on the barrel and mixed with the partially saponified polyvinyl acetate. The amount of the hydrogen peroxide added was adjusted so as to be 1.2 parts by mass per 100 parts by mass of polyvinyl acetate.

After the aqueous hydrogen peroxide solution had been fed, the mixture was melt-kneaded under conditions of a heating temperature of 255° C. and a heating time of 8 minutes to obtain a vinyl alcohol-based polymer. The vinyl alcohol-based polymer was extruded into strands by an extruder, air-cooled, and then cut by a strand cutter to obtain resin particles C4 composed of a vinyl alcohol-based polymer. Large amount of undissolved matter was comprised in the resin particles C4, and it was difficult to carry out the various measurements.

[Evaluation Methods]

(Degree of Saponification)

Carried out in accordance with JIS K6726.

(Block Character)

Measured based on the method described in the text of the specification. The measurement method conformed to the description in Macromolecules, 1982, 15, 1071.

(Ratio of Diad/Triad of Remaining Ester Group and Ratio of Diad/Triad of Hydroxyl Group)

Calculated based on the ratio of the integral value of each peak by 400 MHZ $^1$H-NMR measurement at room temperature of a 1.0 wt % DMSO-d6 solution of the target sample. Specifically, these ratios were calculated by the following formulas.

$$\text{Diad/triad of remaining ester group} = ([A\underline{A}A] + 0.5[A\underline{A}O + O\underline{A}A]) / ([O\underline{A}O] + 0.5[A\underline{A}O + O\underline{A}A])$$

$$\text{Diad/triad of hydroxyl group} = ([O\underline{O}O] + 0.5[A\underline{O}O + O\underline{O}A]) / ([A\underline{O}A] + 0.5[A\underline{O}O + O\underline{O}A])$$

Here, the meaning of each of the above notations is as follows.

[O$\underline{A}$O] (Relative amount of acetyl groups sandwiched between hydroxyl groups): 5.04-5.19 ppm

[A$\underline{A}$O+O$\underline{A}$A] (Relative amount of acetyl groups sandwiched between a hydroxyl group and an acetyl group): 4.90 to 5.05 ppm

[A$\underline{A}$A] (Relative amount of acetyl groups sandwiched between acetyl groups): 4.69-4.91 ppm

[O$\underline{O}$O] (Relative amount of hydroxyl groups sandwiched between hydroxyl groups): 3.75 to 4.15 ppm

[A$\underline{O}$O+O$\underline{O}$A] (Relative amount of hydroxyl groups sandwiched between hydroxyl group and acetyl group): 3.60-3.76 ppm

[A$\underline{O}$A] (Relative amount of hydroxyl group sandwiched between acetyl groups): 3.34-3.61 ppm (Molecular Weight (Mw, Mn), Molecular Weight Distribution Mw/Mn)

Molecular weight and molecular weight distribution were calculated by gel permeation chromatography (GPC) measurement. As a standard sample, polyethylene oxide (19 K) was used, and two SOLDEX SB804 in series+SOLDEX 802.5 were used as the column. Water was used as the solvent, the injection volume was 100 μL, and the solvent flow rate was 1.0 mL/min. Analysis of the molecular weight distribution was performed using the analysis software Omni SEC DATA based on the signals from a light scattering detector, an RI detector, and a viscosity detector.

($^1$H-NMR Measurement)

For the $^1$H-NMR, an NMR apparatus (400 MHZ) manufactured by Bruker Corporation was used. The sample was a 5 mass % solution in deuterated DMSO. Measurement was carried out based on the peak of DMSO (2.49 ppm) with an exponential function (0.2 Hz), integration of 1024 times (prodigy type probe) or 10000 times (normal probe), a delay time of 1 second, and a pulse interval of 12 microseconds.

Figure 2:
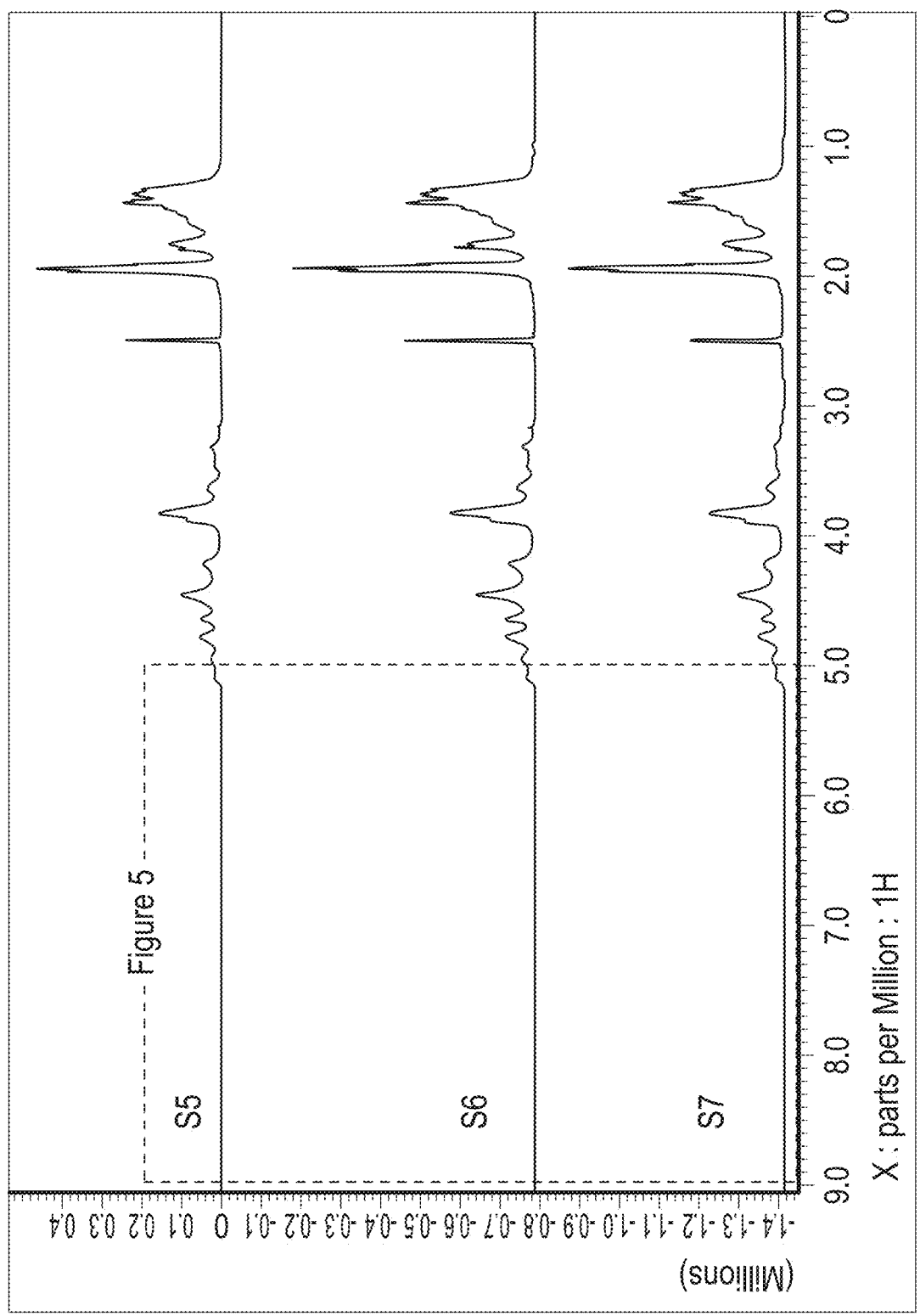
FIG. 2 shows the 1H-NMR spectrum of S5 to S7 obtained in each example.
Figure 3:
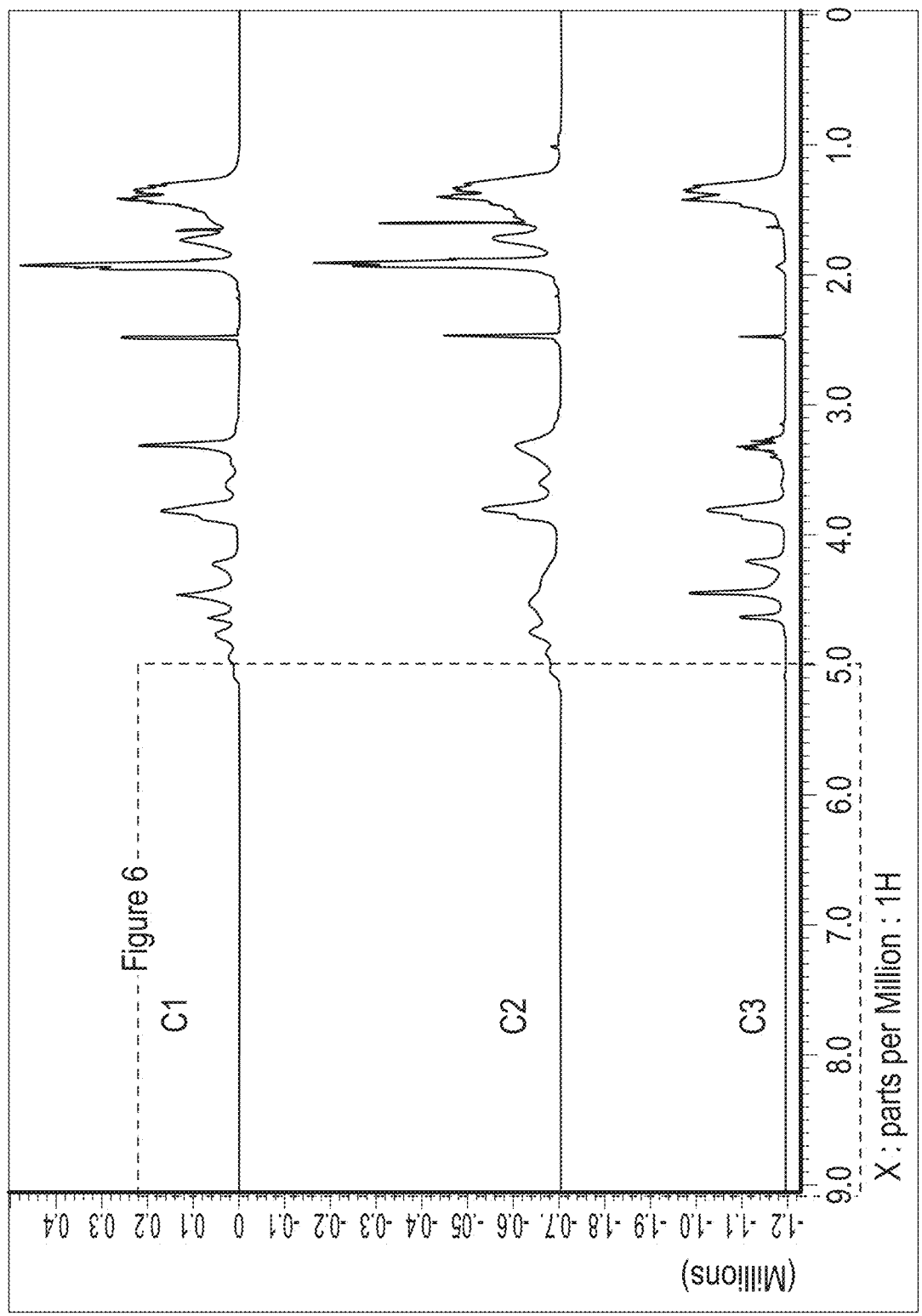
FIG. 3 shows the 1H-NMR spectrum of C1 to S3 obtained in each Comparative Example.
Figure 4:
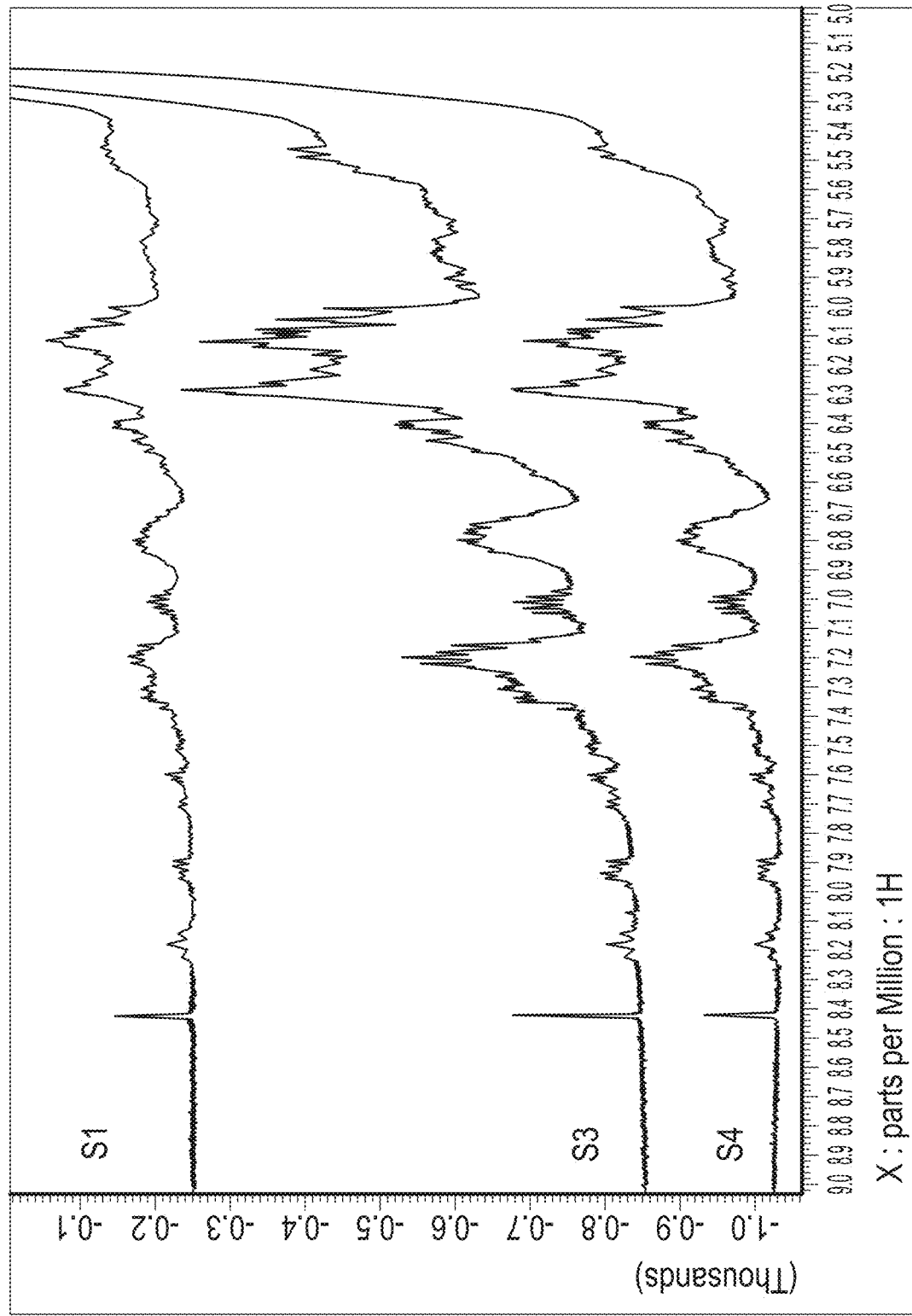
FIG. 4 is an enlarged view of a portion of FIG. 1.
Figure 5:
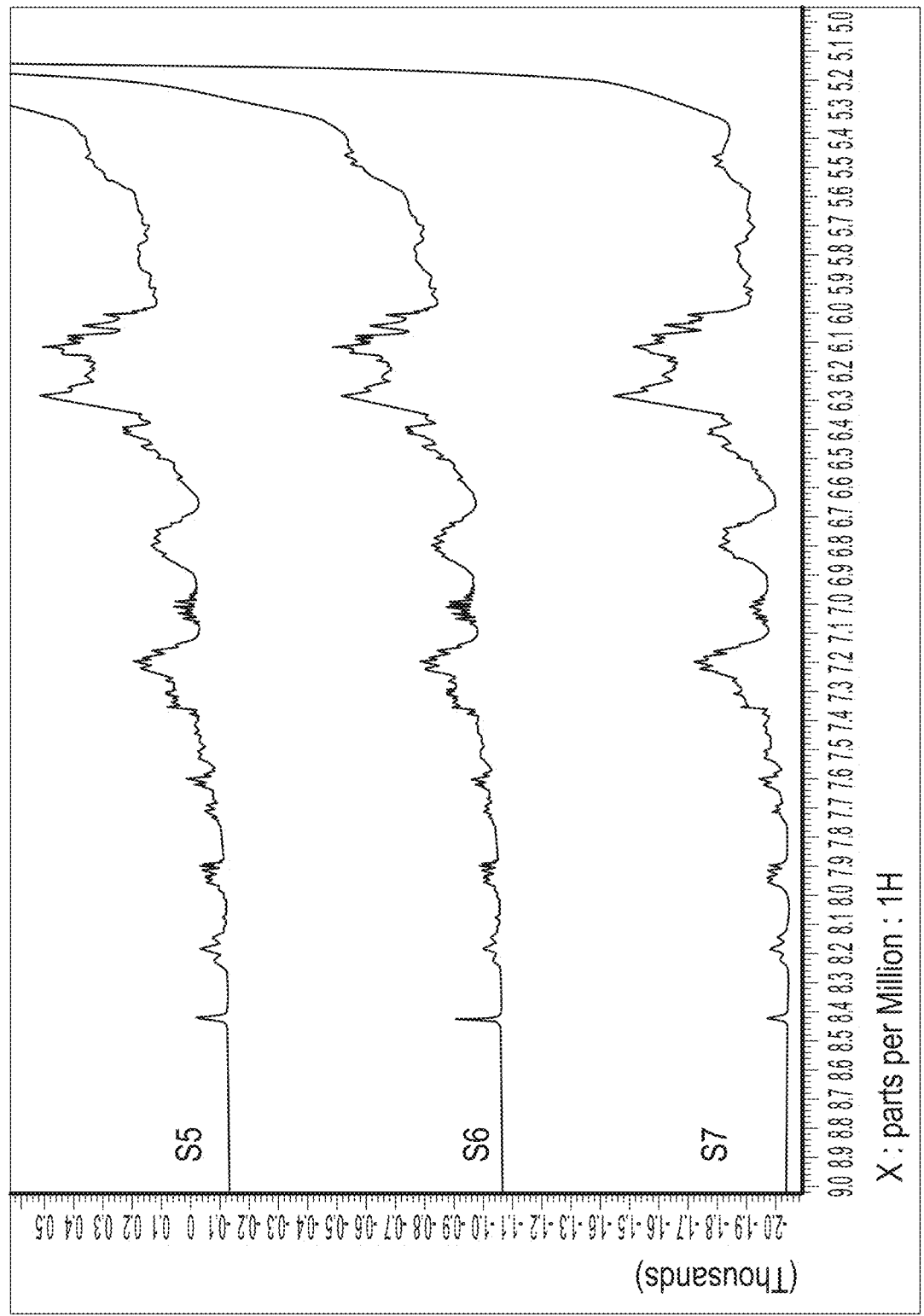
FIG. 5 is an enlarged view of a portion of FIG. 2.
Figure 6:
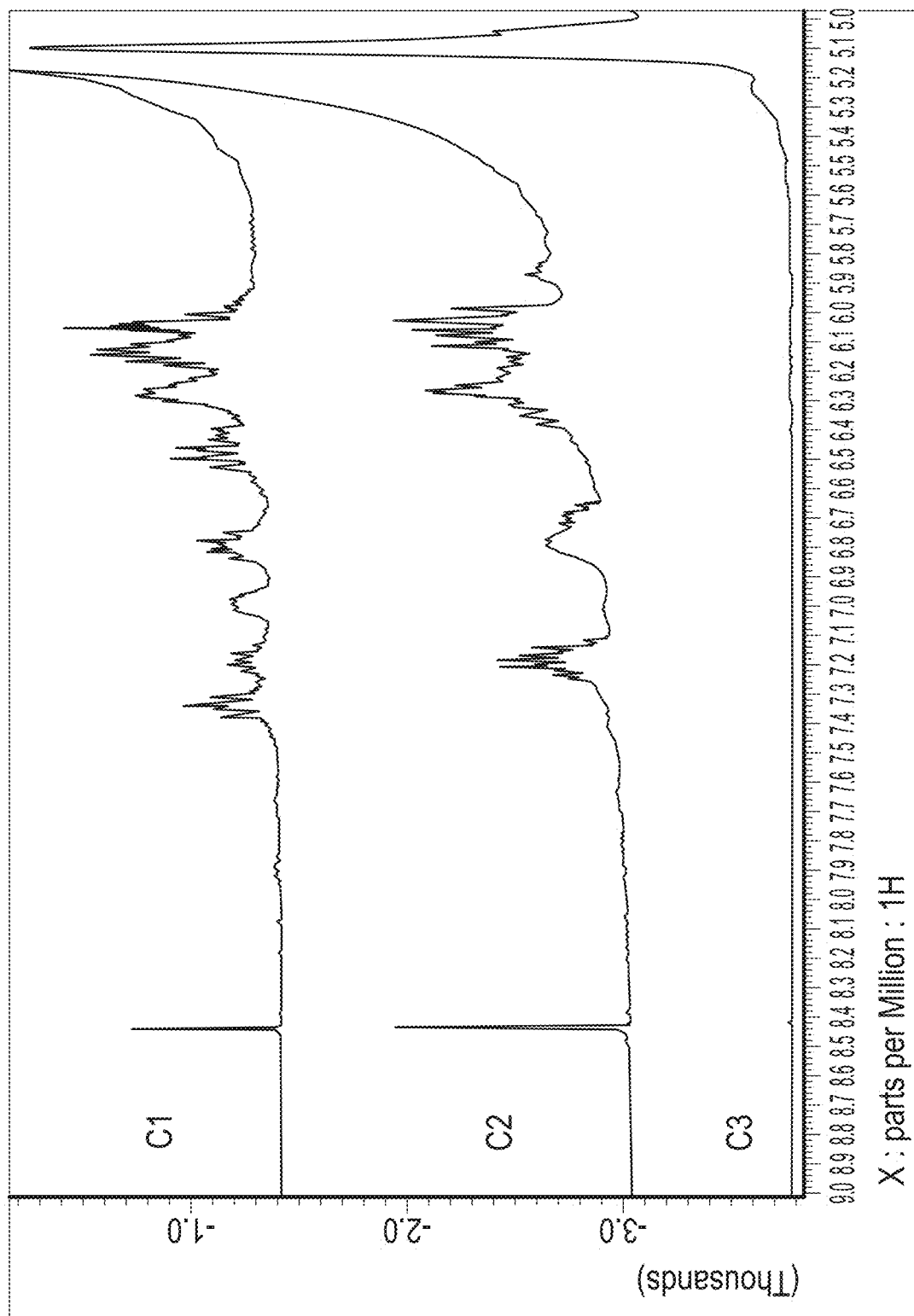
FIG. 6 is an enlarged view of a portion of FIG. 3.
Figure 7:
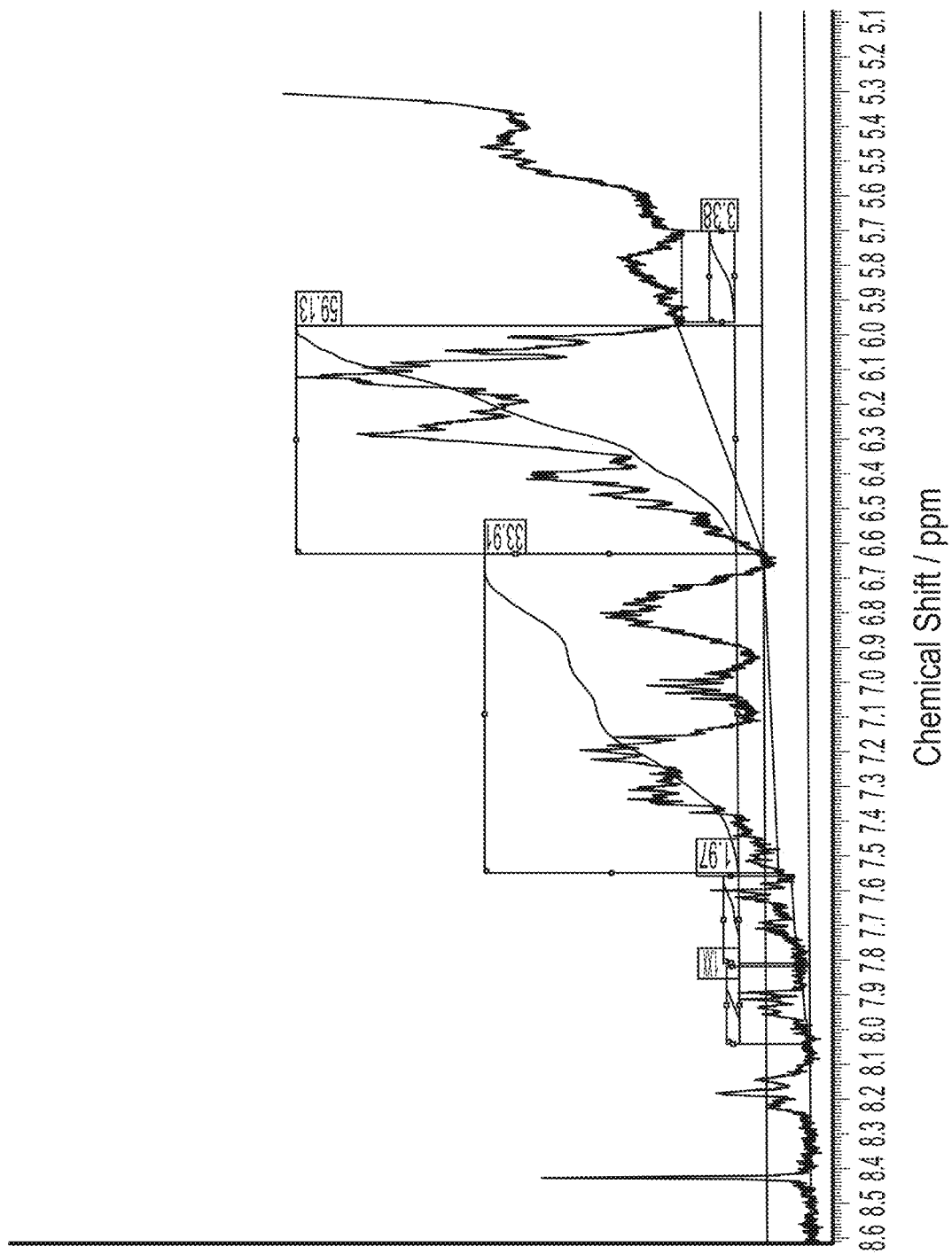
FIG. 7 shows integral value (a) to (e) in the 1H-NMR spectrum of S1.

The $^1$H-NMR spectra of the above samples (S1 to S7, C1 to C3) are shown in FIGS. 1 to 3. Further, partially enlarged views of the $^1$H-NMR spectra of FIGS. 1 to 3 are shown in FIGS. 4 to 6, respectively. FIG. 7 shows integral value (a) to (e) for the $^1$H-NMR spectrum of S1.

(Uv Absorbance)

A 0.1 mass % aqueous solution of the vinyl alcohol-based polymer was prepared, and absorbance at 280 nm and 320 nm was measured. The used measurement apparatus was an Evolution 600 UV-Vis Spectrophotometer (Thermo Fisher Inc., Pittsburgh, PA, USA).

(Viscosity)

A 4 mass % aqueous solution of the vinyl alcohol-based polymer was prepared, and viscosity was measured at 20° C. with a #18 spindle at 100 rpm using a Brookfield viscometer (model LVDV-II+Pro).

(Proportion of Particles Having Particle Size of 1.7 mm or More)

Each sample was sieved to evaluate the proportion of particles having a particle size of 1.7 mm or more.

(Degree of Yellowness)

The degree of yellowness (YI) was determined in accordance with ASTM Standard D1925 by preparing a 4 mass % aqueous solution of the vinyl alcohol-based polymer.

[Production and Evaluation of Polyvinyl Chloride]

A polyvinyl chloride was produced as described below using each of vinyl alcohol-based polymers S1 to S7 and C1 to C4 as a dispersant, and various evaluations were performed.

(Production of Polyvinyl Chloride)

Polymerization was carried out in a 200 L reactor equipped with a Dual Pfaudler type impeller. The reactor was charged with 100 kg of water and the vinyl alcohol-based polymer (PVA) of each Example and Comparative Example as a dispersant in an amount so as to be 400 ppm based on the vinyl chloride monomer. The air in the polymerization vessel was removed by reducing the pressure. Next, the reactor was charged with 70 kg of vinyl chloride monomer, t-butyl peroxyneodecanoate in an amount so as to be 150 ppm based on the vinyl chloride monomer, and cumyl peroxyneodecanoate in an amount so as to be 385 ppm based on the vinyl chloride monomer. Polymerization was carried out at 57° C. by stirring at 450 rpm, and when the pressure of the polymerization vessel had dropped to 7.0 kg/cm$^2$, unreacted vinyl chloride monomer was recovered, the contents were taken out, dewatered, and dried to obtain a polyvinyl chloride.

In addition, separately from the above, a polyvinyl chloride was obtained in the same manner as described above, but by changing the amount of the vinyl alcohol-based polymer placed so as to be 500 ppm based on the vinyl chloride monomer.

The following evaluations were performed on the obtained polyvinyl chlorides.

(Bulk Density)

The bulk density (g/cm$^3$) of the polyvinyl chloride produced in each of the Examples and Comparative Examples was measured in accordance with JIS K 6721. The bulk density was measured for both the polyvinyl chloride produced using 400 ppm of vinyl alcohol-based polymer and the polyvinyl chloride produced using 500 ppm of vinyl alcohol-based polymer, and the data having the higher bulk density was employed and is shown in the table.

(Average Particle Size)

The average particle size (μm) of the polyvinyl chloride (PVC) produced in each Example and Comparative Example was measured by a particle size distribution analyzer. The average particle size was applied to both the polyvinyl chloride produced using 400 ppm of vinyl alcohol-based polymer and the polyvinyl chloride produced using 500 ppm of vinyl alcohol-based polymer.

(Occurrence of Undissolved Lumps of Flour)

The polyvinyl chloride produced in each of the Examples and Comparative Examples was visually evaluated for the presence or absence of the occurrence of undissolved lumps of flour.

TABLE 1

| | Item | | Example 1 | Example 2 | Example 3 | Example 4 | Example 5 | Example 6 |
|---|---|---|---|---|---|---|---|---|
| Vinyl alcohol-based polymer (PVA) | Sample name | | S1 | S3 | S4 | S5 | S6 | S7 |
| | Appearance | | resin particles | resin particles | resin particles | resin particles | resin particles | resin particles |
| | Degree of saponification | mol % | 72.3 | 70.6 | 70.7 | 71.2 | 70.4 | 71.3 |
| | Viscosity of 4% aqueous solution | cP | 7.5 | 6.0 | 6.4 | 6.2 | 7.2 | 6.1 |
| | Block character of remaining ester group | — | 0.474 | 0.452 | 0.469 | 0.47 | 0.481 | 0.490 |
| | Ratio of diad/triad of remaining ester group | — | 1 | 1.2 | 1.2 | 1.1 | 1 | 1 |
| | Ratio of diad/triad of hydroxyl group | — | 2.8 | 2.8 | 3.1 | 2.7 | 2.8 | 2.6 |
| | Number average molecular weight (Mn(A)) | kDa | 76 | 146 | 138 | 151 | 128 | 152 |
| | Weight average molecular weight (Mw(A)) | kDa | 218 | 442 | 400 | 398 | 304 | 326 |
| | (Mw(A)/Mn(A)) | — | 2.87 | 3.03 | 2.90 | 2.64 | 2.38 | 2.14 |
| | Absorbance (a1) at 280 nm | Abs/0.1% aqueous solution | 0.22 | 0.55 | 0.38 | 0.47 | 0.39 | 0.60 |
| | Absorbance (a2) at 320 nm | Abs/0.1% aqueous solution | 0.17 | 0.37 | 0.28 | 0.33 | 0.28 | 0.39 |
| | (a1)/(a2) | | 1.35 | 1.49 | 1.36 | 1.42 | 1.39 | 1.54 |
| | Ratio of particles having particle size of 1.7 mm or more | wt % | 99 | 98 | 98 | 97 | 97 | 97 |
| | Undissolved matter (*1) | wt % | 0.023 | 0.095 | 0.060 | 0.051 | 0.023 | 0.111 |
| | Degree of yellowness (YI D1925) of 4% aqueous solution | | 42.5 | 55.3 | 35.6 | 52.4 | 62.1 | 72.3 |
| | NMR peak integral value | | | | | | | |
| | (a) 5.70-5.96 ppm | Each integral value when sum of integral value (a) to (e) = 100 | 3.36 | 2.57 | 1.52 | 2.69 | 2.29 | 1.38 |
| | (b) 5.97-6.63 ppm | | 59.13 | 58.83 | 60.74 | 58.27 | 59.30 | 61.70 |
| | (c) 6.64-7.55 ppm | | 33.91 | 36.36 | 35.63 | 35.36 | 34.90 | 33.32 |
| | (d) 7.56-7.81 ppm | | 1.97 | 1.32 | 1.00 | 1.79 | 2.06 | 1.83 |
| | (e) 7.82-8.04 ppm | | 1.63 | 1.02 | 1.10 | 1.89 | 1.45 | 1.77 |
| Production Conditions | Peroxide type | chemical species | hydrogen peroxide | hydrogen peroxide | hydrogen peroxide | hydrogen peroxide | hydrogen peroxide | hydrogen peroxide |
| | Amount of peroxide blended | parts by mass (*2) | 0.3 | 0.6 | 0.3 | 0.6 | 0.44 | 0.8 |
| | Heat treatment temperature | °C. | 242 | 197 | 199 | 193 | 210 | 209 |
| | Heat treatment time | minutes | 7.5 | 6 | 6 | 6 | 6 | 6 |
| Evaluation | Occurrence of undissolved lumps of flour | | no | no | no | no | no | no |
| | PVC average particle size/μm | Amount of PVA added, 400 ppm | 172 | 155 | 167 | 157.7 | 161.3 | 151.3 |
| | | Amount of PVA added, 500 ppm | 162 | 145 | 157 | 144.4 | 150.3 | 148.5 |
| | Bulk density | | 0.595 | 0.605 | 0.584 | 0.604 | 0.593 | 0.586 |

(*1) Ratio of component remaining on filter when an aqueous solution having a concentration of the vinyl alcohol-based polymer of 7 mass % obtained by dissolving at 5° C. for 12 hours is filtered with a 200 mesh filter
(*2) Parts by mass per 100 parts by mass of polyvinyl acetate

TABLE 2

| | Item | | Comparative Example 1 | Comparative Example 2 | Comparative Example 3 | Comparative Example 4 |
|---|---|---|---|---|---|---|
| Vinyl alcohol-based polymer (PVA) | Sample name | | C1 | C2 | C3 | C4 |
| | Appearance | | powder | powder | resin particles | resin particles |
| | Degree of saponification | mol % | 73.1 | 71.4 | 93.2 | large amount of undissolved matter, evaluation not possible |
| | Viscosity of 4% aqueous solution | cP | 5.7 | 5.6 | 22.1 | |
| | Block character of remaining ester group | — | 0.432 | 0.52 | 0.431 | |
| | Ratio of diad/triad of remaining ester group | — | 1.2 | 1 | 1.4 | |
| | Ratio of diad/triad of hydroxyl group | — | 3.4 | 2.6 | 2.7 | |
| | Number average molecular weight (Mn(A)) | kDa | 64 | 101 | 132 | |
| | Weight average molecular weight (Mw(A)) | kDa | 185 | 199 | 399 | |
| | (Mw(A)/Mn(A)) | — | 2.90 | 2.90 | 3.02 | |
| | Absorbance (a1) at 280 nm | Abs/0.1% aqueous solution | 0.56 | 0.49 | 0.08 | 1.17 |
| | Absorbance (a2) at 320 nm | Abs/0.1% aqueous solution | 0.48 | 0.36 | 0.04 | 0.61 |
| | (a1)/(a2) | | 1.17 | 1.36 | 2 | 2 |
| | Ratio of particles having particle size of 1.7 mm or more | wt % | 0 | 0 | 0.98 | 0.97 |
| | Undissolved matter (*1) | wt % | 0.01 or less | 0.030 | 0.01 or less | 45.6 |
| | Degree of yellowness (YI D1925) of 4% aqueous solution | | 27.1 | 64.6 | 10.1 | 73.8 |

TABLE 2-continued

| Item | | Comparative Example 1 | Comparative Example 2 | Comparative Example 3 | Comparative Example 4 |
|---|---|---|---|---|---|
| NMR peak integral value | | | | | |
| (a) 5.70-5.96 ppm | Each integral | 0.00 | 2.13 | 8.11 | large amount of undissolved matter, evaluation not possible |
| (b) 5.97-6.63 ppm | value when sum | 66.64 | 65.76 | 60.54 | |
| (c) 6.64-7.55 ppm | of integral value | 32.19 | 31.78 | 27.39 | |
| (d) 7.56-7.81 ppm | (a) to (e) = 100 | 0.50 | 0.25 | 3.61 | |
| (e) 7.82-8.04 ppm | | 0.68 | 0.08 | 0.34 | |
| Production Conditions | Peroxide type | chemical species | — | — | glycerin | hydrogen peroxide |
| | Amount of peroxide blended | parts by mass (*2) | — | — | 9.3 | 1.2 |
| | Heat treatment temperature | °C. | — | — | 180 | 255 |
| | Heat treatment time | minutes | — | — | 4 | 8 |
| Evaluation | Occurrence of undissolved lumps of flour | | yes | yes | no | large amount of undissolved matter, evaluation not possible |
| | PVC average particle size/μm | Amount of PVA added, 400 ppm | 160 | | abnormal polymerization | |
| | | Amount of PVA added, 500 ppm | 150 | 157 | | |
| | Bulk density | | 0.576 | 0.574 | evaluation not possible | |

(*1) Ratio of component remaining on filter when an aqueous solution having a concentration of the vinyl alcohol-based polymer of 7 mass % obtained by dissolving at 5° C. for 12 hours is filtered with a 200 mesh filter
(*2) Parts by mass per 100 parts by mass of polyvinyl acetate It can be seen that the polyvinyl chloride produced using the vinyl alcohol-based polymer of each Example satisfying the requirements of the present invention as a dispersant for polyvinyl chloride suspension polymerization has an average particle size of 130 to 180 μm, which is in an appropriate range, and has a high bulk density.

On the other hand, the polyvinyl chloride produced using the vinyl alcohol-based polymer of the Comparative Examples not satisfying the requirements of the present invention as a dispersant for polyvinyl chloride suspension polymerization either had a low bulk density or could not be evaluated.

The invention claimed is:

1. A vinyl alcohol-based polymer, having a value defined by the following integral value (e) of 0.8 to 20 in the case when a sum of the following integral value (a) to (e) is 100 in a $^1$H-NMR spectrum
   (a) integral value of peak confirmed at 5.70 to 5.96 ppm
   (b) integral value of peak confirmed at 5.97 to 6.63 ppm
   (c) integral value of peak confirmed at 6.64 to 7.55 ppm
   (d) integral value of peak confirmed at 7.56 to 7.81 ppm
   (e) integral value of peak confirmed at 7.82 to 8.04 ppm.

2. The vinyl alcohol-based polymer according to claim 1, wherein a degree of saponification is 65 to 80 mol %, a block character of a remaining ester group is 0.45 to 0.62, and a ratio a1/a2 of an absorbance a1 of a 0.1 mass % aqueous solution at a wavelength of 280 nm and an absorbance a2 of the aqueous solution at a wavelength of 320 nm is 1.6 or less.

3. The vinyl alcohol-based polymer according to claim 1, wherein a ratio (Mw/Mn) of a weight-average molecular weight Mw to a number-average molecular weight Mn is 2.6 to 14.

4. The vinyl alcohol-based polymer according to claim 1, wherein a ratio of diad/triad of a remaining ester group is 0.7 to 1.3 and a ratio of diad/triad of a hydroxyl group is 2.0 to 3.5.

5. The vinyl alcohol-based polymer according to claim 1, wherein a remaining ester group is an acetoxy group.

6. The vinyl alcohol-based polymer according to claim 1, wherein a viscosity of a 4 mass % aqueous solution is 5 to 9 cP.

7. The vinyl alcohol-based polymer according to claim 1, wherein a degree of yellowness (YI) of a 4 mass % aqueous solution is 30 to 80.

8. The vinyl alcohol-based polymer according to claim 1, wherein when an aqueous solution having a concentration of the vinyl alcohol-based polymer of 7 mass % obtained by dissolving at 5° C. for 12 hours is filtered with a 200 mesh filter, a component remaining on the filter as undissolved matter is less than 0.1%.

9. The vinyl alcohol-based polymer according to claim 1, which is used as a dispersant for polyvinyl chloride suspension polymerization.

10. A resin particle composed of the vinyl alcohol-based polymer according to claim 1.

11. The resin particle according to claim 10, wherein 95% or more of the particles have a particle size of 1.7 mm or more.

12. A vinyl alcohol-based polymer, having a value defined by the following integral value (c) of 30 to 50 and a value defined by the following integral value (d) of 0.8 to 10 in the case when a sum of the following integral value (a) to (e) is 100 in a $^1$H-NMR spectrum
   (a) integral value of peak confirmed at 5.70 to 5.96 ppm
   (b) integral value of peak confirmed at 5.97 to 6.63 ppm
   (c) integral value of peak confirmed at 6.64 to 7.55 ppm
   (d) integral value of peak confirmed at 7.56 to 7.81 ppm
   (e) integral value of peak confirmed at 7.82 to 8.04 ppm.

13. A resin particle composed of the vinyl alcohol-based polymer according to claim 12.

14. The resin particle according to claim 13, wherein 95% or more of the particles have a particle size of 1.7 mm or more.

* * * * *